United States Patent
Tsaplin et al.

(10) Patent No.: US 10,972,511 B2
(45) Date of Patent: Apr. 6, 2021

(54) STREAMING RELAY FOR DIGITAL SIGNAGE

(71) Applicant: Adobe Inc., San Jose, CA (US)

(72) Inventors: Vitaly Tsaplin, Basel (CH); Alexandre Capt, Landser (FR)

(73) Assignee: Adobe Inc., San Jose, CA (US)

( * ) Notice: Subject to any disclaimer, the term of this patent is extended or adjusted under 35 U.S.C. 154(b) by 334 days.

(21) Appl. No.: 15/805,426

(22) Filed: Nov. 7, 2017

(65) Prior Publication Data

US 2019/0141085 A1    May 9, 2019

(51) Int. Cl.
| | |
|---|---|
| *H04L 29/06* | (2006.01) |
| *H04N 21/81* | (2011.01) |
| *H04N 21/414* | (2011.01) |
| *G06F 3/14* | (2006.01) |
| *H04N 21/4402* | (2011.01) |
| *H04N 21/436* | (2011.01) |
| *G06F 3/147* | (2006.01) |

(52) U.S. Cl.
CPC .......... *H04L 65/1013* (2013.01); *G06F 3/147* (2013.01); *G06F 3/1446* (2013.01); *H04L 65/4069* (2013.01); *H04L 65/602* (2013.01); *H04L 65/607* (2013.01); *H04L 65/608* (2013.01); *H04N 21/41415* (2013.01); *H04N 21/436* (2013.01); *H04N 21/440236* (2013.01); *H04N 21/8153* (2013.01); *G09G 2380/06* (2013.01)

(58) Field of Classification Search
CPC .................................................. H04L 65/1013
USPC ........................................................ 709/219
See application file for complete search history.

(56) References Cited

U.S. PATENT DOCUMENTS

| | | | | |
|---|---|---|---|---|
| 8,544,033 | B1* | 9/2013 | Acharya | H04H 60/33 725/10 |
| 2003/0016225 | A1* | 1/2003 | Ramsay, III | G09G 3/003 345/543 |
| 2006/0028399 | A1* | 2/2006 | Glen | G06F 3/1438 345/2.3 |
| 2008/0122734 | A1* | 5/2008 | Sudo | H04N 21/4882 345/1.3 |
| 2013/0291079 | A1* | 10/2013 | Lowe | H04L 65/403 726/7 |
| 2015/0286456 | A1* | 10/2015 | Griffin | G06T 1/60 345/1.2 |
| 2016/0119413 | A1* | 4/2016 | Antipa | H04L 67/104 709/204 |
| 2016/0210104 | A1* | 7/2016 | Welck | G09F 9/3026 |
| 2016/0225012 | A1* | 8/2016 | Ha | G06Q 30/0242 |

(Continued)

*Primary Examiner* — Moustafa M Meky
*Assistant Examiner* — Sm Z Islam
(74) *Attorney, Agent, or Firm* — Finch & Maloney PLLC (57) ABSTRACT

Digital signage techniques are disclosed that utilize streaming technology to deliver digital signage content to digital signage display devices. In some examples, a method may include rendering a digital signage content frame by frame, capturing an image of each rendered frame, transforming the captured image of each rendered frame into a video frame of a video stream, and delivering the video stream to at least one remote display device. The captured image may be an image of a portion of the rendered frame. The display devices that receive the video stream may render the video stream using a streaming media player.

18 Claims, 7 Drawing Sheets

(56) References Cited

U.S. PATENT DOCUMENTS

2018/0091568 A1* 3/2018 Edgington, Jr. ............................. H04N 21/41415

* cited by examiner

STREAMING RELAY FOR DIGITAL SIGNAGE

FIELD OF THE DISCLOSURE

This disclosure relates generally to digital signage, and more particularly, to delivery of digital signage content.

BACKGROUND

Digital signage is a marketing technique that utilizes display devices to deliver, in real-time, customized digital signage content, such as digital images, videos, animations, web pages, multi-media, text, audio, and the like. Digital signage can be found in public spaces, transportation systems, retail locations, hotels, restaurants, and sides of buildings, to name a few examples, to deliver the digital content. Digital signage can be used in a wide range of applications, such as targeting advertising and promotion, public communication, internal communication, product communication, brand awareness, wayfinding, and influencing customer behavior. Digital signage can be provided using a stand-alone, on-premise solution (e.g., an on-premise server) or a software-as-a-service (SaaS) solution (e.g., a cloud server). In both solutions, a digital signage system, either on premise or in the cloud, delivers the digital signage content to the display devices, which in turn displays the digital signage content.

BRIEF DESCRIPTION OF THE DRAWINGS

The accompanying drawings are not intended to be drawn to scale. In the drawings, each identical or nearly identical component that is illustrated in various figures is represented by a like numeral, as will be appreciated when read in context.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

DETAILED DESCRIPTION

Digital signage systems can deliver digital signage content to various display devices. The display devices include screens and associated processors configured to execute content players that render the digital signage content. In many instances, as the digital signage content can be quite sophisticated, the content players are developed using web browser technology. However, it can be difficult to develop content players to support the rendering of digital signage content on the various different display devices. For example, a display device may not provide the necessary hardware or software capabilities (e.g., no or limited file system, no or limited runtime engine, no or limited software development kit support, etc.) to support the development and execution of a content player for the display device. Also, certain display devices may only provide private application programming interfaces, which make the development and support of content players for the display devices difficult and expensive. Moreover, a content player needs to be developed for each new display device, which results in a delay in supporting digital signage on the new display device. Similarly, new content players need to be developed and tested to support newly developed web standards such as Hypertext Markup Language (HTML), Cascading Style Sheets (CSS), etc.

To this end, techniques are disclosed herein for utilizing streaming technology to deliver digital signage content to digital signage display devices. In some embodiments, a streaming relay system renders digital signage content as a visual flow, separates or slices the visual flow into frames, and transforms the frames into a video stream. The streaming relay system sends the video stream to one or more display devices using Internet Protocol (IP) multicasts or any other suitable streaming protocol. The rendering of the video stream (digital signage content) is performed by each display device using a streaming media player. Most display devices provide support for streaming technology out-of-the-box. In instances where a particular display device does not support streaming technology, a streaming media player can be implemented for the display device. Implementing a streaming media player for a display device is less difficult, for example, with regards to programming effort and needed computational resources, than implementing a content player for the display device.

In some embodiments, the streaming relay system is implemented to execute on a server computing system, and includes a renderer module and an encoder module. The renderer module renders the digital signage content frame by frame on the server computing device, and captures each frame into an image. The renderer module provides or otherwise makes available each image (captured frame) to the encoder module, and the encoder module transforms the images into respective video frames of a video stream. The video stream representing the digital signage content is then delivered (e.g., broadcast or otherwise transmitted) to one or more appropriate display devices for rendering by the display devices. For example, the renderer module can utilize a browser application to render the digital signage content. When a frame is rendered in the browser application, the renderer module can capture an image of the rendered frame. The renderer module can provide the captured image to the encoder module, which transforms the captured image into a video frame of a video stream, and broadcasts the video stream using suitable streaming protocols, such as Hypertext Transfer Protocol (HTTP), User Datagram Protocol (UDP), Real Time Streaming Protocol (RTSP), Real-time Transport Protocol (RTP), RTP Control Protocol (RTCP), and the like. In some embodiments, the renderer module renders the digital signage content off screen. That is, the digital signage content is not rendered on an actual display screen but, rather, in software (e.g., in a display application).

In some embodiments, each rendered frame of digital signage content may be separated into multiple sub-frames, each sub-frame of the multiple sub-frames captured as separate images, and the separate images for each of the multiple sub-frames transformed into video frames of multiple respective video streams. Each video stream of the multiple video streams can then be delivered to different display devices, for example, the different display devices in a video wall, for rendering by the display devices. In an example use case, a system administrator can specify the layout of the multiple display devices in a video wall, including information as to which portion of the rendered frame each of the multiple display devices is to render, using a configuration file. The streaming relay can configure the renderer module to separate each rendered frame of the digital signage content into multiple sub-frames based on the information specified in the configuration file. The streaming relay can also configure the renderer module to capture each of the sub-frames into an image. The streaming relay can configure the encoder module to transform the captured images of each sub-frame into video frames of a video stream, thus generating multiple video streams, one video stream for each sub-frame, and deliver the multiple video streams to the respective display devices in the video wall. For example, the system administrator may specify in the configuration file the layout of a 2×2 video wall (e.g., a grid of display devices, such as four display devices arranged in a 2×2 configuration), and specify that the upper left display device is to display the upper left quadrant of the digital signage content, that the upper right display device is to display the upper right quadrant of the digital signage content, that the lower left display device is to display the lower left quadrant of the digital signage content, and that the lower right display device is to display the lower right quadrant of the digital signage content. Based on the information specified in the configuration file, the streaming relay can configure the renderer module to capture the upper right quadrant of each rendered frame as an image, capture the upper left quadrant of each rendered frame as an image, capture the lower right quadrant of each rendered frame as an image, and capture the lower left quadrant of each rendered frame as an image. The streaming relay can configure the encoder module to transform the captured images of the four quadrants of the rendered frames of the digital signage content into video frames of four video streams (separate video streams for each of the four quadrants), and deliver each of the four video streams to the appropriate display devices in the video wall. For example, the video stream generated from the images captured from the upper left quadrant of each rendered frame can be delivered to the upper left display device in the video wall, the video stream generated from the images captured from the upper right quadrant of each rendered frame can be delivered to the upper right display device in the video wall, the video stream generated from the images captured from the lower left quadrant of each rendered frame can be delivered to the lower left display device in the video wall, and the video stream generated from the images captured from the lower right quadrant of each rendered frame can be delivered to the lower right display device in the video wall.

Note that in some embodiments, the multiple display devices need not be arranged or configured as a video wall. That is, some of the multiple display devices can be positioned or located at disparate locations. In some embodiments, a portion of the digital signage content can be rendered on one or more display devices. For example, each rendered frame of digital signage content may be separated into multiple sub-frames, each sub-frame of the multiple sub-frames captured as separate images, and the separate images of the multiple sub-frames transformed into multiple, respective video streams. Each video stream of the multiple video streams can then be delivered to one or more display devices for rendering by the display devices. In still other embodiments, a portion or portions of the rendered frame (i.e., not the entire frame) can be transformed into respective video streams for rendering by one or more display devices.

In some embodiments, the streaming relay is configured to support interactive content, for example, interactive digital signage content. For example, on display devices that support or provide interaction with a user, digital signage content that supports user interaction may be rendered using a client application, such as a thin client application. The client application on the display device can capture a user interaction or interactions with the rendered interactive digital signage content (e.g., the video stream of the interactive digital signage content), and provide the captured interactions to the streaming relay. The streaming relay can instantiate a renderer process, for example, from a pool of renderer processes, based on the user interaction to generate a unique video stream in response to the detected user interaction. For example, the renderer module can render default digital signage content frame by frame and, for each rendered frame, capture an image of the rendered frame. The encoder module can then transform the captured images of the default signage content into a default video stream, and deliver the default video stream to one or more display devices. When user interaction is detected on a specific one of the display devices, the client application on the specific display device can inform the streaming relay of an interactive session on the specific display device. The streaming relay can then "fork" the default video stream, and instantiate a dedicated renderer (a dedicated renderer process) to generate a unique video stream in response to the user interaction. The streaming relay can then provide the unique video stream to the client application on the specific display device (the display device having the interactive session). The streaming relay (e.g., the renderer module and the encoder module) can continue to deliver the default video stream of the default digital signage content to the other display devices (e.g., the display devices other than the specific display device). At the conclusion of the interactive session (e.g., the interactive session is terminated or no user interaction is detected on the display device for a threshold time period), the dedicated renderer process can be stopped, or returned to the pool of renderer processes, and the streaming relay can resume delivery of the default video stream of the default digital signage content to the specific display device.

System Architecture

Figure 1:
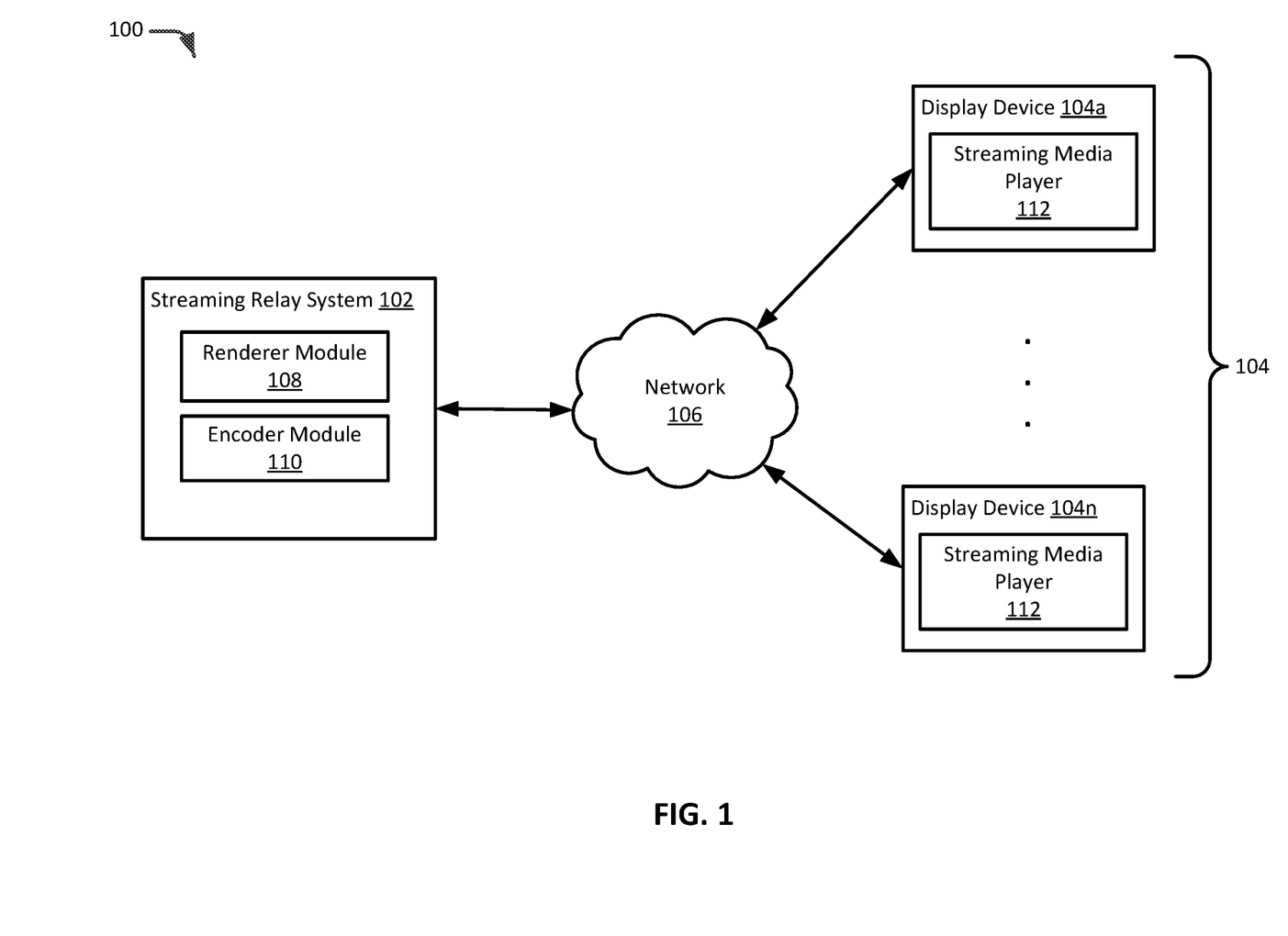
FIG. 1 illustrates an overview of an environment in which a streaming relay system may operate, in accordance with at least some embodiments described herein.

Turning now to the figures, FIG. 1 illustrates an overview of an environment 100 in which a streaming relay system 102 may operate, in accordance with at least some embodiments described herein. Environment 100 may include streaming relay system 102 illustrated as operating in a networked environment using logical connections to one or more remote display devices 104a-104n, through a network 106. Display devices 104a-104n may be individually referred to herein as display device 104 or collectively referred to herein as display devices 104. Streaming relay system 102 is configured to process digital signage content, and generate a video stream that represents the digital signage content. Streaming relay system 102 is further configured to deliver the generated video stream of the digital signage content to display devices 104. In some embodiments, streaming relay system 102 streams the video stream of the digital signage content in real-time to display devices 104. Network 106 can be a local area network, a wide area network, the Internet, other wired or wireless networks, and/or combinations thereof.

As depicted, streaming relay system 102 includes a renderer module 108 and an encoder module 110. In various embodiments, additional components (not illustrated, such as a processor, display, user input device, etc.) or a subset of the illustrated components can be employed without deviating from the scope of the present disclosure. For instance, other embodiments may integrate the various functionalities of modules 108 and 110 into fewer modules (e.g., one) or more modules (e.g., three or four, or more). In addition, further note that the various components of streaming relay system 102 may all be in a stand-alone computing system according to some embodiments, while in others, may be distributed across multiple machines. In a more general sense, the degree of integration and distribution of the functional component(s) provided herein can vary greatly from one embodiment to the next, as will be appreciated in light of this disclosure.

Renderer module 108 is configured to render digital signage content frame by frame. For example, renderer module 108 may render each frame of the digital signage content in a browser application. In some embodiments, renderer module 108 renders the frames of the digital signage content off screen. That is, when rendering the digital signage content, renderer module 108 does not display the frames of the digital signage content on a display screen. Renderer module 108 is further configured to capture each rendered frame into an image. For example, when a frame is ready to be rendered, for example, in the browser application, renderer module 108 can capture an image of the frame. Renderer module 108 provides or otherwise makes available the images of the frames to encoder engine 110.

In another example use case and embodiment, renderer module 108 is configured to capture a specified portion of each rendered frame into an image. For example, a specified portion of the digital signage content (e.g., a video portion of the digital signage content that includes the video, text, animation, and audio) may be provided as a visual experience on display devices 104. In this case, streaming relay system 102 may configure renderer module 108 to render digital signage content frame by frame, and capture the specified portion (e.g., the video portion) of each rendered frame into an image. In still another use case and embodiment, renderer module 108 is configured to capture specified portions of each rendered frame into respective images. For example, specified portions of the digital signage content (e.g., a video portion and a web page portion of the digital signage content that includes the video, text, animation, web page, and audio) may be provided as a visual experience on display devices 104. In this case, streaming relay system 102 may configure renderer module 108 to render digital signage content frame by frame, and capture a first specified portion (e.g., the video portion) of each rendered frame into an image, and a second specified portion (e.g., the web page portion) of each rendered frame into another image that is different from the image of the video portion. In yet another use case and embodiment, renderer module 108 is configured to capture multiple images for each rendered frame, where each image of the multiple images is of a portion of the rendered frame. For example, the digital signage content may be provided as a visual experience on display devices 104 arranged as a video wall. In this case, streaming relay system 102 may configure renderer module 108 to render digital signage content frame by frame, and capture the specified portions of each rendered frame into respective images (e.g., capture each portion of each rendered frame into an image).

Encoder module 110 is configured to transform images into a video stream. Encoder module 110 is further configured to deliver (e.g., cause transmission of) the video stream to one or more display devices 104. For example, encoder module 110 may transform an image of a frame captured by renderer module 108 into a video frame, and deliver the video frame as part of a video stream to one or more display devices 104. In some embodiments, encoder module 110 may be configured to generate multiple video streams based on the multiple images of each rendered frame captured by renderer module 108, and provide each video stream of the multiple video streams to one or more display devices 104. For example, in the example use case above where renderer module 108 is configured to capture a first specified portion (e.g., the video portion) of each rendered frame into an image, and a second specified portion (e.g., the web page portion) of each rendered frame into another image, streaming relay system 102 may configure encoder module 110 to transform the images of the video portion into video frames of a video stream of the video portion, and transform the images of the web page portion into video frames of another video stream of the web page portion. Streaming relay system 102 may also configure encoder module 110 to deliver the video stream of the video portion to a first group of display devices 104, and the video stream of the web page portion to a second group of display devices 104. In another example, in the example use case above where renderer module 108 is configured to capture the specified portions of each rendered frame into respective images for rendering on a video wall, streaming relay system 102 may configure encoder module 110 to transform the images of each portion of a rendered frame into video frames of a video stream, thus generating multiple video streams based on the portions of the rendered frames, and deliver the video streams to respective display devices 104 in the video wall.

Display devices 104 may be various types of electronic display devices, such as digital billboards, projection display systems, light-emitting diode displays, television displays, and the like. Display devices 104 may communicate with streaming relay system 102 to facilitate the rendering of digital signage content, such as advertisements, notifications, directions, and the like, as described herein. Display devices 104 may be located in a public space, such as a store, a stadium, and side of a building, to name a few examples. Display devices 104 may also be located in a private space, such as within a corporate building. The number of display devices 104 depicted in environment 100 is for illustration, and other example embodiments may include a different number of display devices.

As depicted, each display device 104 includes a streaming media player 112. In various embodiments, additional components (not illustrated, such as a processor, display, user input device, etc.) or a subset of these components can be employed by display devices 104 without deviating from the scope of the present disclosure. Streaming media player 112 is configured to play (render) streaming content, such as streaming video, on a display of display device 104. For example, streaming media player 112 may render the video stream provided by streaming relay system 102 on a display of display device 104 for viewing by users in the vicinity of display device 104.

In some embodiments, some of display devices 104 may additionally or alternatively include a client application (not illustrated), such as a thin client application, configured to allow users to interact with the client application. For example, the client application may be configured to render the video stream (e.g., interactive video stream) provided by streaming relay system 102, detect and capture interactions by a user with the rendered video stream, and provide the captured interactions to streaming relay system 102. In response to the detected interactions, streaming relay system 102 may provide the client application a different video stream (e.g., video stream that is different from the video stream previously provided to the client application prior to the user interaction) that is responsive to the detected user interaction.

In some embodiments, streaming relay system 102 may include a pool of one or more dedicated renderer processes (not illustrated) for providing unique video streams in response to interaction events detected at display devices 104. In an example use case, streaming replay system 102 may be providing to display devices 104 a video stream of digital signage content that includes a web page. A client application on a specific display device 104 may detect and capture a user interaction with the web page portion of the rendered video stream, and inform streaming relay system 102 of the captured user interaction on the specific display device 104. In response to the captured user interaction with the web page, streaming relay system 102 can fork the video stream that is being currently provided to the specific display device 104, and use a dedicated renderer process from the pool of dedicated renderer processes to generate a unique video stream for the specific display device 104. For example, the unique video stream may be a video stream of a web page that results from (e.g., is responsive to) the captured user interaction. The unique video stream can then be provided to the client application on the specific display device 104, and the client application can render the unique video stream (e.g., the video stream of the web page in response to the detected user interaction) on the specific display device 104. Streaming relay system 102 can continue to provide the current video stream to the remaining display devices 104 (e.g., display devices 104 other than the specific display device 104). At the conclusion of the user interactions with the unique video stream being rendered on the specific display device 104, streaming relay system 102 can stop the dedicated renderer process, and resume providing the current video stream to the specific display device 104. As will be appreciated in light of this disclosure, streaming relay system 102 can utilize multiple dedicated renderer processes to provide multiple unique video streams to multiple display devices 104. For example, interactive sessions (e.g., user interactions) may be detected and captured at multiple display devices 104. In this instance, streaming relay system 102 can use multiple dedicated renderer processes from the pool of renderer processes to generate respective unique video streams for the interactive sessions at the multiple display devices 104.

Figure 2:
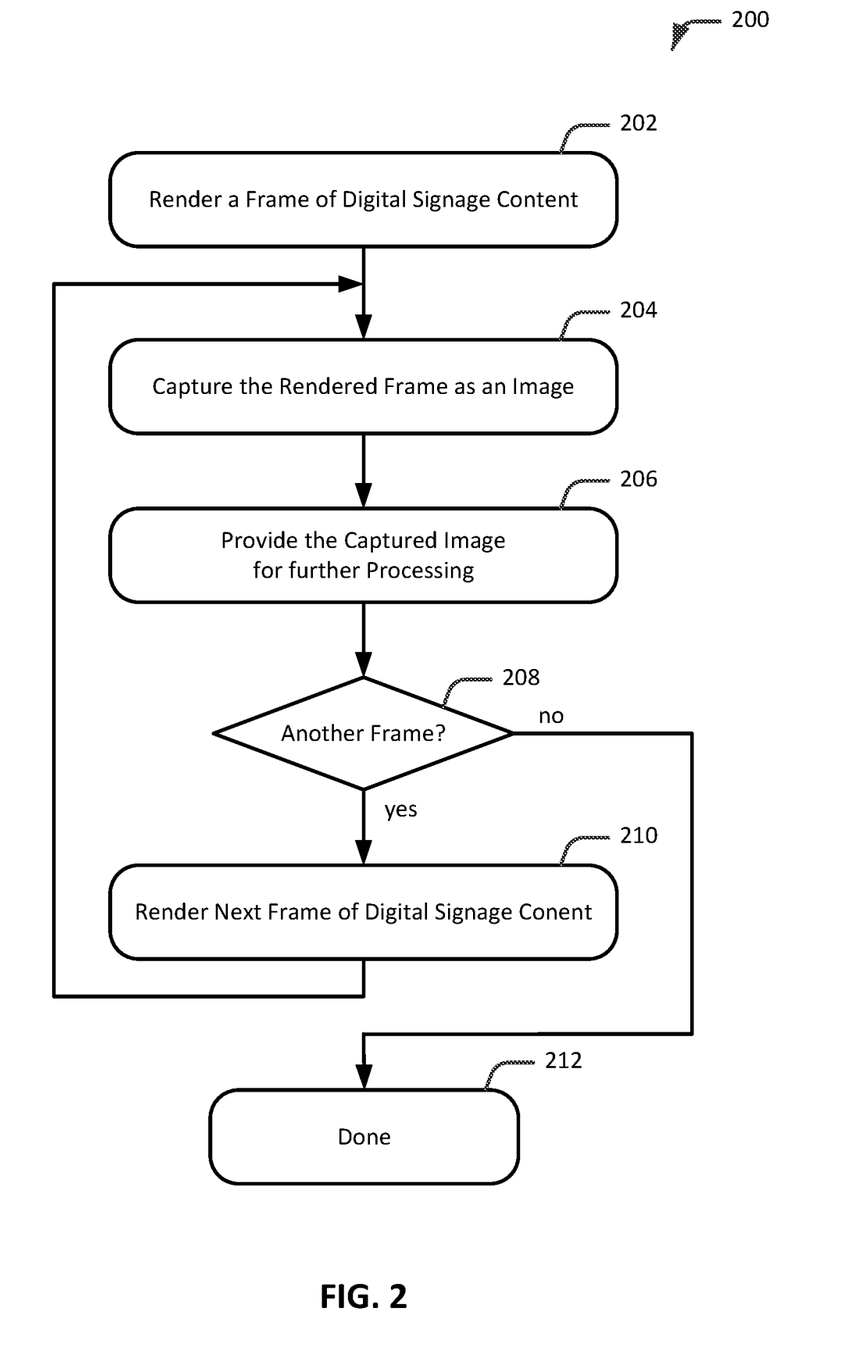
FIG. 2 is a flow diagram illustrating an example process to capture an image of a rendered frame of digital signage content to generate a video stream, in accordance with at least some embodiments described herein.
Figure 3:
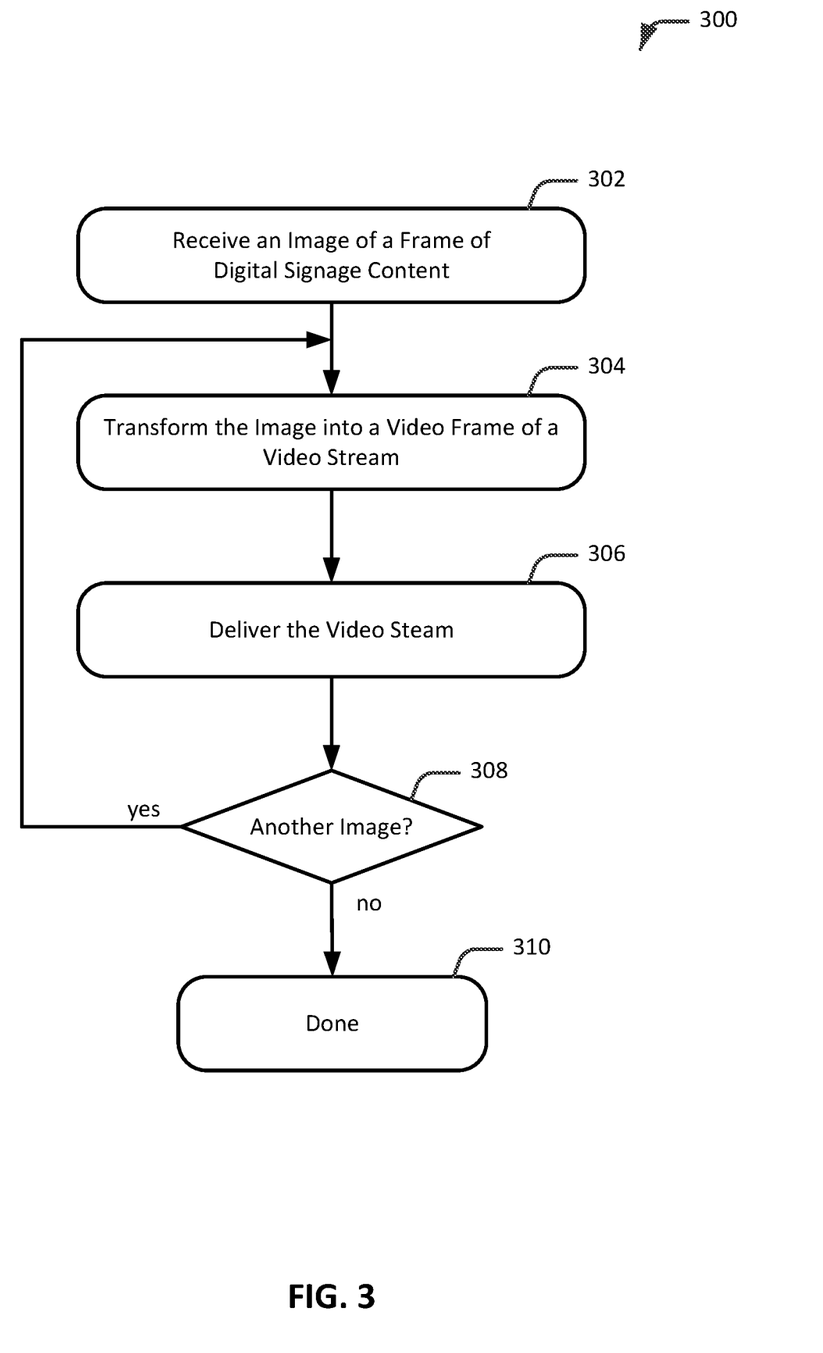
FIG. 3 is a flow diagram illustrating an example process to provide a video stream that represents digital signage content, in accordance with at least some embodiments described herein.
Figure 4:
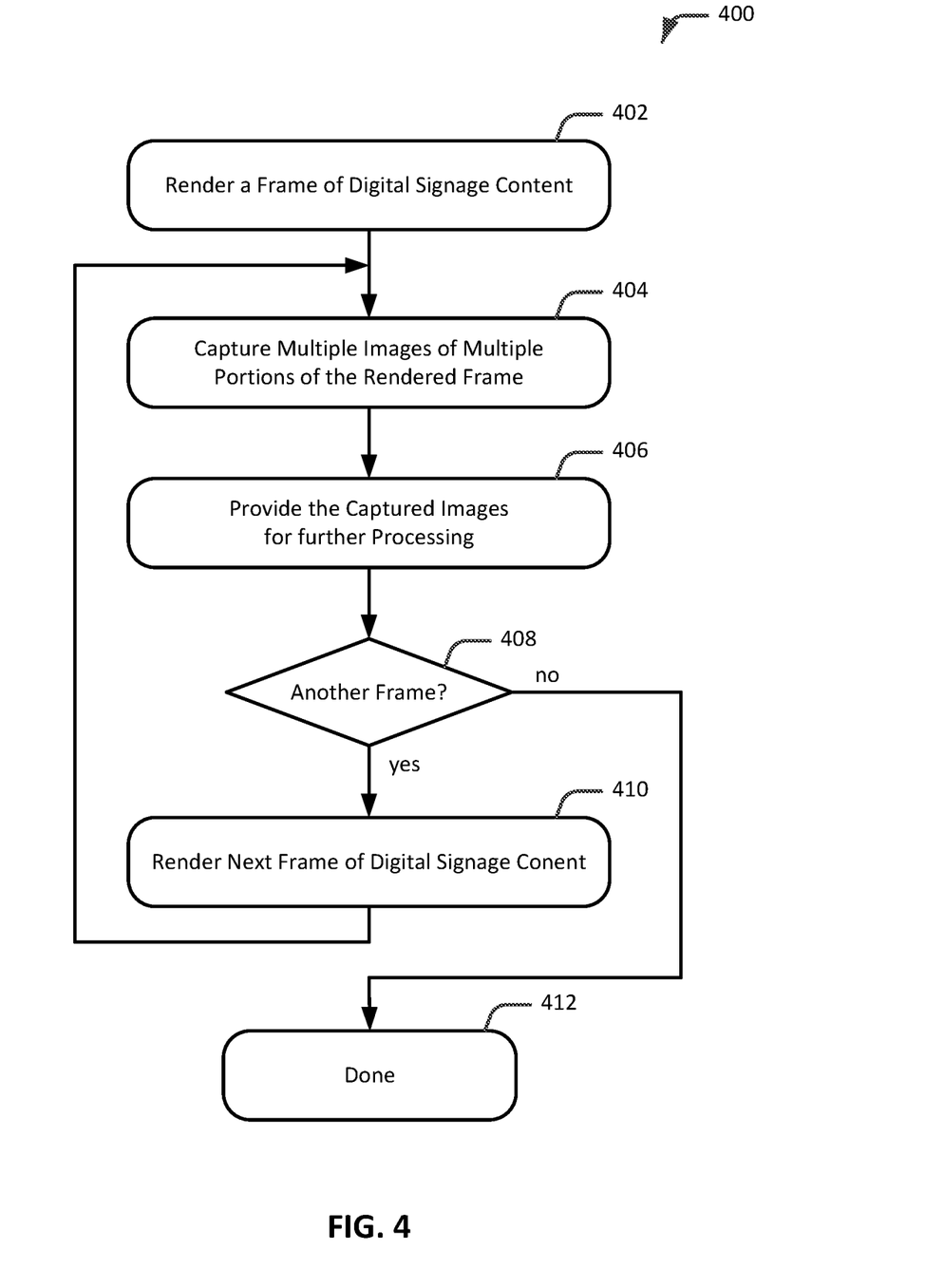
FIG. 4 is a flow diagram illustrating an example process to capture multiple images of a rendered frame of digital signage content to generate multiple video streams, in accordance with at least some embodiments described herein.
Figure 5:
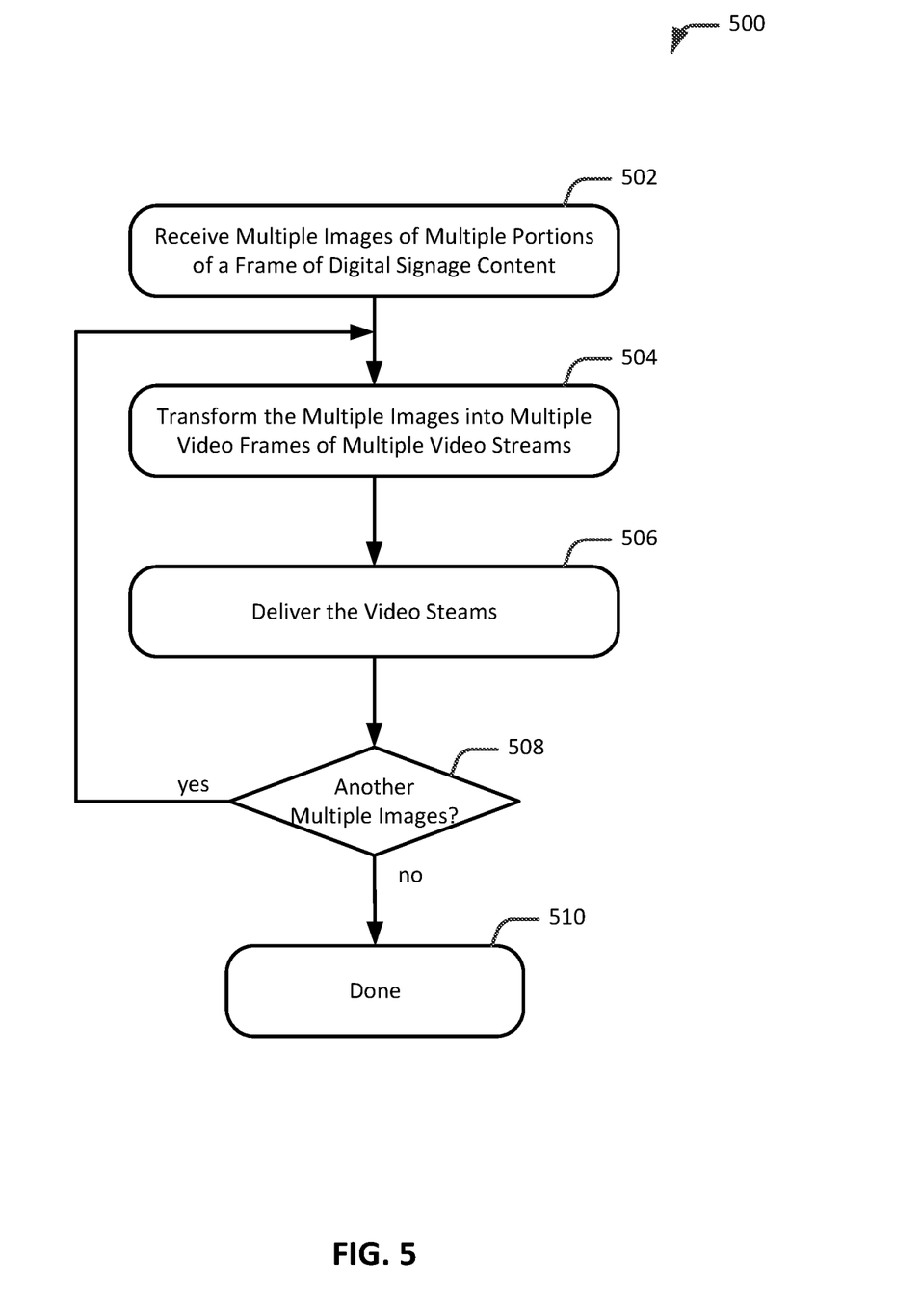
FIG. 5 is a flow diagram illustrating an example process to provide multiple video streams that represent digital signage content, in accordance with at least some embodiments described herein.
Figure 6:
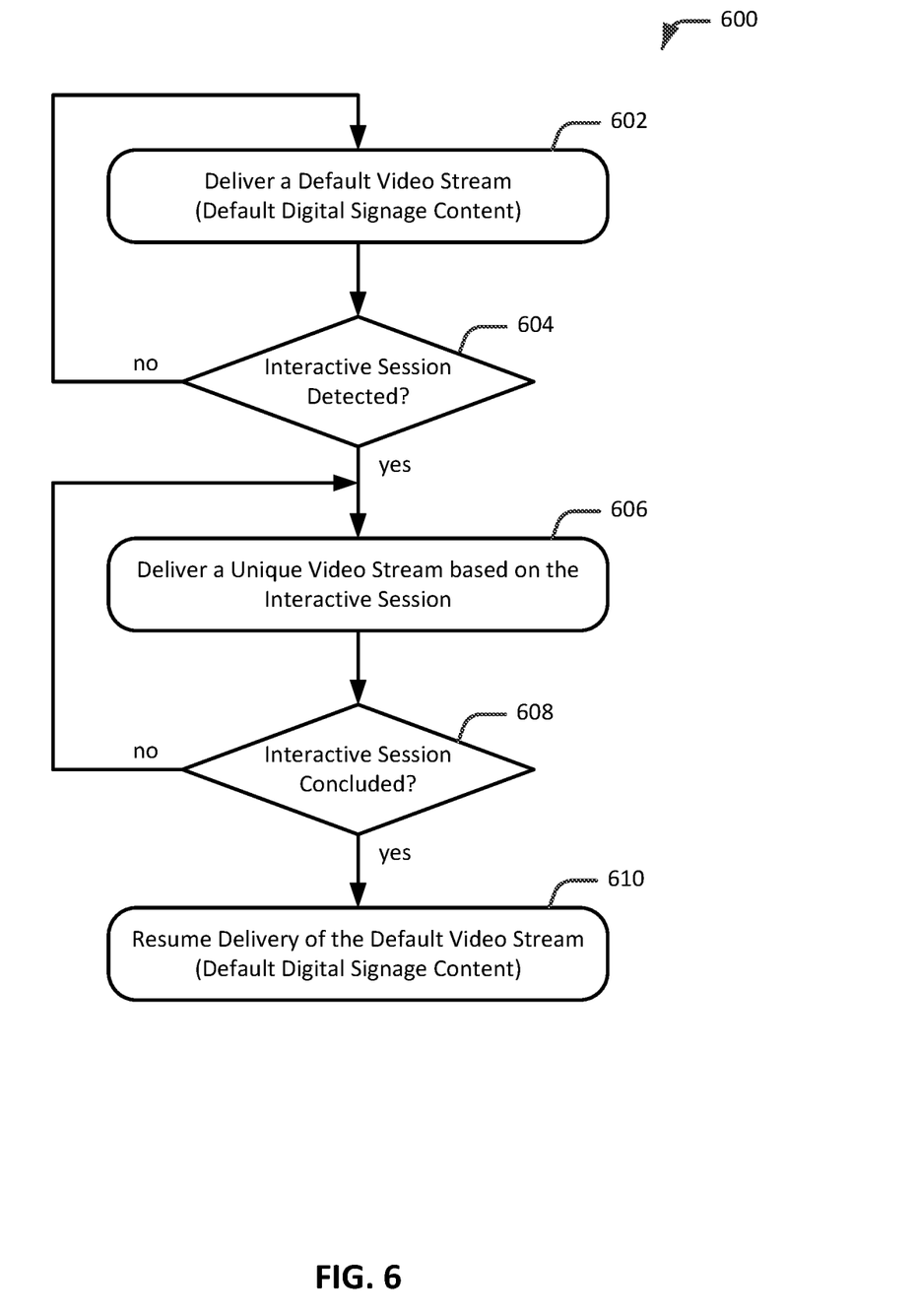
FIG. 6 is a flow diagram illustrating an example process to provide a unique video stream that represents digital signage content for an interactive session, in accordance with at least some embodiments described herein.

FIG. 2 is a flow diagram 200 illustrating an example process to capture an image of a rendered frame of digital signage content to generate a video stream, in accordance with at least some embodiments described herein. FIG. 3 is a flow diagram 300 illustrating an example process to provide a video stream that represents digital signage content, in accordance with at least some embodiments described herein. FIG. 4 is a flow diagram 400 illustrating an example process to capture multiple images of a rendered frame of digital signage content to generate multiple video streams, in accordance with at least some embodiments described herein. FIG. 5 is a flow diagram 500 illustrating an example process to provide multiple video streams that represent digital signage content, in accordance with at least some embodiments described herein. FIG. 6 is a flow diagram 600 illustrating an example process to provide a unique video stream that represents digital signage content for an interactive session, in accordance with at least some embodiments described herein. The operations, functions, or actions illustrated in the example processes of flow diagrams 200, 300, 400, 500, and 600 may in some embodiments be performed by streaming relay system 102 and, more particularly, renderer module 108 or encoder module 110 of FIG. 1. The operations, functions, or actions described in the respective blocks of the example processes of flow diagrams 200, 300, 400, 500, and 600 may also be stored as computer-executable instructions in a computer-readable medium, such as memory 704 and/or data storage 706 of computing system 700. The processes may be performed by components of streaming relay system 102.

As will be further appreciated in light of this disclosure, for this and other processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

With reference to FIG. 2, as depicted by flow diagram 200, the process may begin with block 202, where renderer module 108 renders a frame of digital signage content. Renderer module 108 may be executing on a server computing system, and may render the frame of digital signage content off screen using a suitable application, such as a browser application.

Block 202 may be followed by block 204, where renderer module 108 captures an image of the rendered frame of digital signage content. For example, renderer module 108 may be triggered by every "paint" event of the browser application being utilized to render the frame to capture an image of the frame of digital signage content. In some embodiments, renderer module 108 captures an image of a portion of the rendered frame of digital signage content.

Block 204 may be followed by block 206, where renderer module 108 provides the captured image of the frame of digital signage content for further processing. For example, the captured image may be provided or otherwise made available to encoder module 110 for further processing of the captured image by encoder module 110.

Block 206 may be followed by decision block 208, where renderer module 108 checks to determine whether there is another frame of digital signage content to render. If renderer module 108 determines that there is another frame of digital signage content to render, decision block 208 may be followed by block 210, where renderer module 108 renders a next frame of digital signage content, and continues with processing of the rendered next frame of digital signage content. Otherwise, if renderer module 108 determines that there is not another frame of digital signage content to render, decision block 208 may be followed by block 212, where renderer module 108 completes processing of the digital signage content.

With reference to FIG. 3, as depicted by flow diagram 300, the process may begin with block 302, where encoder module 110 receives an image of a frame of digital signage content. For example, the image of the frame of digital signage content may be captured and provided by renderer module 108.

Block 302 may be followed by block 304, where encoder module 110 transforms the image of the frame of digital signage content into a video frame of a video stream. For example, the image frame may be transformed into a video frame using suitable technologies for processing and handling multimedia data such as FFmpeg, Libav, and libVLC, to name a few examples.

Block 304 may be followed by block 306, where encoder module 110 delivers (e.g., causes transmission of) the video stream to one or more display devices 104. The video stream is of the digital signage content that is being rendered frame by frame by renderer module 108. For example, encoder module 110 can broadcast the video stream for reception by one or more display devices 104. In some embodiments, encoder module 110 can transmit the video stream to each of the one or more display devices. For example, the client application on each of the display devices 104 can connect to the server computing system, thus instantiating a dedicated streaming session on demand. Encoder module 110 can then transmit the video stream over the dedicated streaming sessions to the one or more display devices.

Block 306 may be followed by decision block 308, where encoder module 110 checks to determine whether there is another image of another frame of digital signage content to process. For example, renderer module 108 may provide an image of the next frame of the digital signage content for processing by encoder module 110. If encoder module 110 determines that there is another image (e.g., an image of the next frame of digital signage content) to process, decision block 308 may be followed by block 304, where encoder module 110 transforms the another image (e.g., the image of the next frame of digital signage content) into another video frame (e.g., a next video frame) of the video stream, and continues with processing of the another video frame. Otherwise, if encoder module 110 determines that there is not another image to process, decision block 308 may be followed by block 310, where encoder module 110 completes processing of the captured images of the rendered frames of digital signage content.

With reference to FIG. 4, as depicted by flow diagram 400, the process may begin with block 402, where renderer module 108 renders a frame of digital signage content. Renderer module 108 may be executing on a server computing system, and may render the frame of digital signage content off screen using a suitable application, such as a browser application.

Block 402 may be followed by block 404, where renderer module 108 captures multiple images of multiple portions of the rendered frame of digital signage content. For example, renderer module 108 can capture each portion of various portions of the rendered frame as a distinct image, thus generating multiple images of the rendered frame. The multiple portions may, but need not, cover the entire rendered frame. Stated another way, the multiple images may cover or depict the entire rendered frame, or, alternatively, may cover or depict a portion or portions of the rendered frame, but not the entire rendered frame.

Block 404 may be followed by block 406, where renderer module 108 provides the captured set of multiple images of multiple portions of the frame of digital signage content for further processing. For example, the captured set of multiple images of multiple portions of the frame of digital signage content may be provided or otherwise made available to encoder module 110 for further processing.

Block 406 may be followed by decision block 408, where renderer module 108 checks to determine whether there is another frame of digital signage content to render. If renderer module 108 determines that there is another frame of digital signage content to render, decision block 408 may be followed by block 410, where renderer module 108 renders a next frame of digital signage content, and continues with processing of the rendered next frame of digital signage content. Otherwise, if renderer module 108 determines that there is not another frame of digital signage content to render, decision block 408 may be followed by block 412, where renderer module 108 completes processing of the digital signage content.

With reference to FIG. 5, as depicted by flow diagram 500, the process may begin with block 502, where encoder module 110 receives a set of multiple images of multiple portions of a frame of digital signage content. For example, the multiple images of the multiple portions of the frame of digital signage content may be captured and provided by renderer module 108.

Block 502 may be followed by block 504, where encoder module 110 transforms the multiple images of the multiple portions of the frame of digital signage content into multiple video frames of multiple video streams. Each video stream of the multiple video streams is of a specific portion of the multiple portions of the frame of digital signage content.

Block 504 may be followed by block 506, where encoder module 110 delivers (e.g., cause transmission of) the multiple video streams to one or more display devices 104. Information as to display devices 104 that are to receive each of the multiple video streams may be specified in a configuration file. For example, a system administrator may specify the addressing information of display devices 104 that are to receive each of the multiple video streams in the configuration file, and encoder module 110 can deliver the multiple video streams based on the addressing information specified in the configuration file. In some embodiments, encoder module 110 may be configured with the necessary addressing information to deliver the multiple video streams.

Block 506 may be followed by decision block 508, where encoder module 110 checks to determine whether there is another set of multiple images of multiple portions of another frame of digital signage content to process. For example, renderer module 108 may provide another set of multiple images of multiple portions of the next frame of the digital signage content for processing by encoder module 110. If encoder module 110 determines that there is another set of multiple images (e.g., multiple images of multiple portions of the next frame of digital signage content) to process, decision block 508 may be followed by block 504, where encoder module 110 transforms the another set of multiple images (e.g., multiple images of multiple portions of the next frame of digital signage content) into multiple video frames, where each of the multiple video frames is the next video frame of each of the multiple video streams. Otherwise, if encoder module 110 determines that there is not another set of multiple images to process, decision block 508 may be followed by block 510, where encoder module 110 completes processing of the captured multiple images of multiple portions of the rendered frames of digital signage content.

With reference to FIG. 6, as depicted by flow diagram 600, the process may begin with block 602, where streaming relay system 102 delivers a default video stream. For example, streaming relay system 102 may utilize renderer module 108 and encoder module 110 to generate and deliver the default video stream from default digital signage content as described herein. The default video stream may be delivered to one or more display devices 104.

Block 602 may be followed by decision block 604, where streaming relay system 102 checks to determine whether an interactive session is detected on one of display devices 104 on which the default video stream is being rendered. For example, respective client applications rendering the default video stream on display devices 104 may check to determine whether there is an interaction with the rendered video stream by a user (e.g., whether there is a start of an interactive session by a user). The client application can inform streaming relay system 102 of any detected and captured user interaction. If streaming relay system 102 determines that an interactive session is not detected at any of display devices 104, decision block 604 may be followed by block 602, where streaming relay system 102 continues delivery of the default video stream.

Otherwise, if streaming relay system 102 determines that an interactive session is detected at one of display devices 104, decision block 604 may be followed by block 606, where streaming relay system 102 delivers a unique video stream to the client application on the one of display devices 104 on which the interactive session is detected. The unique video stream is based on the detected interactive session. In some embodiments, the streaming relay system 102 may utilize a dedicated renderer to generate the unique video stream. For example, the dedicated renderer can render a unique digital signage content that is based on (e.g., that is responsive to) the interactive session frame by frame, and capture an image of each rendered frame. Encoder module 110 can then be utilized to transform the captured image into a video frame of the unique video stream, and deliver the unique video stream to the client application on the one of display devices 104 on which the interactive session is detected. Streaming relay system 102 continues to deliver the default video stream to the others of display devices 104 (e.g., display devices 104 on which no interactive session is detected).

Block 606 may be followed by decision block 605, where streaming relay system 102 checks to determine whether the detected interactive session concludes. If streaming relay system 102 determines that the detected interactive session is concluded, decision block 608 may be followed by block 610, where streaming relay system 102 resumes delivery of the default video stream to the client application on the one of display devices 104 on which the interactive session is concluded.

Otherwise, if streaming relay system 102 determines that the detected interactive session is not concluded, decision block 608 may be followed by block 606, where streaming relay system 102 continues the delivery of a unique video stream based on the detected interactive session. The unique video stream is delivered to the client application on the one of display devices 104 on which the interactive session is detected and continues.

Figure 7:
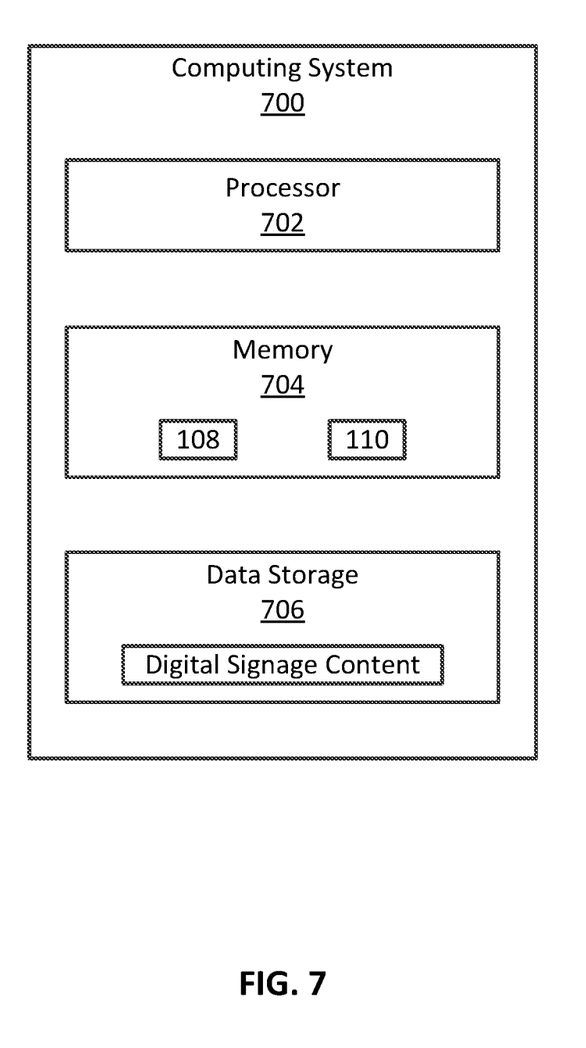
FIG. 7 illustrates selected components of an example computing system that may be used to perform any of the techniques as variously described in the present disclosure, in accordance with at least some embodiments described herein.

FIG. 7 illustrates selected components of example computing system 700 that may be used to perform any of the techniques as variously described in the present disclosure, in accordance with at least some embodiments described herein. In some embodiments, computing system 700 may be configured to implement or direct one or more operations associated with some or all of the engines, components and/or modules associated with streaming relay system 102 of FIG. 1. For example, renderer module 108 and encoder module 110, or any combination of these may be implemented in and/or using computing system 700. In one example case, for instance, each of renderer module 108 and encoder module 110 is loaded in memory 704 and executable by a processor 702, and the digital signage content is included in data storage 706. Computing system 700 may be any computer system, such as a workstation, desktop computer, server, laptop, handheld computer, tablet computer (e.g., the iPad™ tablet computer), mobile computing or communication device (e.g., the iPhone™ mobile communication device, the Android™ mobile communication device, and the like), or other form of computing or telecommunications device that is capable of communication and that has sufficient processor power and memory capacity to perform the operations described in this disclosure. A distributed computational system may be provided that includes a multiple of such computing devices. As depicted, computing system 700 may include processor 702, memory 704, and data storage 706. Processor 702, memory 704, and data storage 706 may be communicatively coupled.

In general, processor 702 may include any suitable special-purpose or general-purpose computer, computing entity, or computing or processing device including various computer hardware, firmware, or software modules, and may be configured to execute instructions, such as program instructions, stored on any applicable computer-readable storage media. For example, processor 702 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 7, processor 702 may include any number of processors and/or processor cores configured to, individually or collectively, perform or direct performance of any number of operations described in the present disclosure. Additionally, one or more of the processors may be present on one or more different electronic devices, such as different servers.

In some embodiments, processor 702 may be configured to interpret and/or execute program instructions and/or process data stored in memory 704, data storage 706, or memory 704 and data storage 706. In some embodiments, processor 702 may fetch program instructions from data storage 706 and load the program instructions in memory 704. After the program instructions are loaded into memory 704, processor 702 may execute the program instructions.

For example, in some embodiments, any one or more of the engines, components and/or modules of streaming relay system 102 may be included in data storage 706 as program instructions. Processor 702 may fetch some or all of the program instructions from data storage 706 and may load the fetched program instructions in memory 704. Subsequent to loading the program instructions into memory 704, processor 702 may execute the program instructions such that the computing system may implement the operations as directed by the instructions.

In some embodiments, virtualization may be employed in computing device 700 so that infrastructure and resources in computing device 700 may be shared dynamically. For example, a virtual machine may be provided to handle a process running on multiple processors so that the process appears to be using only one computing resource rather than multiple computing resources. Multiple virtual machines may also be used with one processor.

Memory 704 and data storage 706 may include computer-readable storage media for carrying or having computer-executable instructions or data structures stored thereon. Such computer-readable storage media may include any available media that may be accessed by a general-purpose or special-purpose computer, such as processor 702. By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause processor 702 to perform a certain operation or group of operations.

Modifications, additions, or omissions may be made to computing system 700 without departing from the scope of the present disclosure. For example, in some embodiments, computing system 700 may include any number of other components that may not be explicitly illustrated or described herein.

As indicated above, the embodiments described in the present disclosure may include the use of a special purpose or a general purpose computer (e.g., processor 702 of FIG. 7) including various computer hardware or software modules, as discussed in greater detail herein. As will be appreciated, once a general purpose computer is programmed or otherwise configured to carry out functionality according to an embodiment of the present disclosure, that general purpose computer becomes a special purpose computer. Further, as indicated above, embodiments described in the present disclosure may be implemented using computer-readable media (e.g., memory 704 of FIG. 7) for carrying or having computer-executable instructions or data structures stored thereon.

Numerous example variations and configurations will be apparent in light of this disclosure. According to some examples, systems to provide a video stream for digital signage are described. An example system may include: one or more processors; a renderer module at least one of controllable and executable by the one or more processors, and configured to render a digital signage content frame by frame, and capture an image of each of a plurality of rendered frames; and an encoder module at least one of controllable and executable by the one or more processors, and configured to transform the captured image of each rendered frame of the plurality of rendered frames into a video frame of a video stream, and cause transmission of the video stream to at least one remote display device.

In some examples, the renderer module is configured to render the digital signage content off screen. In other examples, the renderer module is configured to render the digital signage content using a browser application. In still other examples, the captured image is of a portion of the rendered frame. In yet other examples, the video stream is a transformation of the captured image of the portion of the rendered frame. In still further examples, the system further includes at least one display device, and the at least one display device includes a display device included in a video wall comprising a grid of display devices. In other examples, the system further includes a dedicated renderer at least one of controllable and executable by the one or more processors, and configured to generate a unique video stream based on a user interaction detected at a display device.

According to some examples, computer-implemented methods to provide a video stream for digital signage are described. An example computer-implemented method may include: rendering, by a server computing system, a digital signage content frame by frame; capturing, by the server computing system, an image of each of a plurality of rendered frames; transforming, by the server computing system, the captured image of each rendered frame of the plurality of rendered frames into a video frame of a video stream; and causing, by the server computing system, transmission of the video stream to at least one remote display device.

In some examples, rendering the digital signage content is off screen. In other examples, rendering the digital signage content includes rendering in a browser application. In still other examples, the captured image is of a portion of the rendered frame. In yet other examples, the at least one display device is a display device included in a video wall comprising a grid of display devices. In further examples, the digital signage content includes interactive digital signage content. In other examples, responsive to an interactive session at a remote display device, the method may also include, rendering, by the server computing system, a unique digital signage content frame by frame, the unique digital signage content being based on the interactive session; capturing, by the server computing system, an image of each of a plurality of rendered frames of the unique digital signage content; transforming, by the server computing system, the captured image of each rendered frame of the plurality of rendered frames into a video frame of a unique video stream; and causing, by the server computing system, transmission of the unique video stream to the remote display device.

According to some examples, computer program products including one or more non-transitory machine readable mediums encoded with instructions that when executed by one or more processors cause a process to be carried out to provide a video stream for digital signage are described. An example process may include: rendering a digital signage content frame by frame; capturing an image of each of a plurality of rendered frames; transforming the captured image of each rendered frame of the plurality of rendered frames into a video frame of a video stream; and causing transmission of the video stream to at least one remote display device.

In some examples, rendering the digital signage content is off screen. In still other examples, rendering the digital signage content includes rendering in a browser application. In further examples, the captured image is of a portion of the rendered frame. In still further examples, causing transmission of the video stream includes causing a broadcast of the video stream. In other examples, responsive to an interactive session at a remote display device, the process may also include: rendering a unique digital signage content frame by frame, the unique digital signage content being based on the interactive session; capturing an image of each of a plurality of rendered frames of the unique digital signage content; transforming the captured image of each rendered frame of the plurality of rendered frames into a video frame of a unique video stream; and causing transmission of the unique video stream to the remote display device.

As used in the present disclosure, the terms "engine" or "module" or "component" may refer to specific hardware implementations configured to perform the actions of the engine or module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations, firmware implements, or any combination thereof are also possible and contemplated. In this description, a "computing entity" may be any computing system as previously described in the present disclosure, or any module or combination of modulates executing on a computing system.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A system to provide a video stream for digital signage, the system comprising:
   one or more processors;
   a first renderer module, at least one of controllable and executable by the one or more processors, configured to render frames of first digital signage content in a software application and capture an image of each of a plurality of the rendered frames of the first digital signage content, wherein the first renderer module does not display the first digital signage content on a display screen;
   a first encoder module, at least one of controllable and executable by the one or more processors, configured to receive at least some of the captured images from the first renderer module, transform each of at least some of the received captured images of the rendered frames of the first digital signage content into a corresponding video frame of a video stream, and cause transmission of the video stream to a remote display device; and
   a second renderer module, at least one of controllable and executable by the one or more processors, configured to render frames of second digital signage content and capture an image of each of a plurality of the rendered frames of the second digital signage content;
   wherein the second digital signage content is responsive to an interactive session detected at the remote display device; and
   wherein the interactive session is detected at the remote display device after the video stream is transmitted to the remote display device.

2. The system of claim 1, wherein:
   the software application is a browser application; and
   the first renderer module is configured to capture the images of the rendered frames of the first digital signage content in response to a "paint" event detected in the browser application.

3. The system of claim 1, wherein the first renderer module is configured to render the frames of the first digital signage content using a browser application.

4. The system of claim 1, wherein:
   the first renderer module is further configured to capture sub-images of one or more of the rendered frames of the first digital signage content; and
   each captured sub-image is of a portion of a corresponding rendered frame of the first digital signage content.

5. The system of claim 1, wherein:
the first encoder module is further configured to transform each of at least some of the captured images into a plurality of video frames;
a first one of the plurality of video frames forms part of the video stream; and
a second one of the plurality of video frames forms part of an additional video stream.

6. The system of claim 1, wherein the remote display device comprises a video wall comprising a grid of display devices.

7. The system of claim 1, further comprising a second encoder module, at least one of controllable and executable by the one or more processors, configured to receive at least some of the captured images from the second renderer module, transform each of at least some of the received captured images of the rendered frames of the second digital signage content into a corresponding video frame of a unique video stream, and cause transmission of the unique video stream to the remote display device.

8. A computer-implemented method to provide a video stream for digital signage, the method comprising:
rendering, in a software application executing on a server computing system, frames of digital signage content, wherein the digital signage content includes interactive digital signage content;
in response to a first detected event in the software application, capturing, by the server computing system, from the software application, an image of each of a plurality of the rendered frames, wherein the server computing system does not display the digital signage content on a display screen;
transforming, by the server computing system, at least some of the captured images into a corresponding video frame of a video stream;
causing, by the server computing system, transmission of the video stream to a remote display device; and
responsive to an interactive session at the remote display device:
rendering, by the server computing system, alternative frames of alternative digital signage content in the software application, the alternative digital signage content being based on the interactive session;
in response to a second detected event in the software application, capturing, by the server computing system, from the software application, an alternative image of each of a plurality of the rendered alternative frames of the alternative digital signage content;
transforming, by the server computing system, at least some of the captured alternative images into an alternative video frame of an alternative video stream; and
causing, by the server computing system, transmission of the alternative video stream to the remote display device.

9. The method of claim 8, wherein:
the software application is a browser application; and
the images are captured in response to a drawing event detected in the browser application.

10. The method of claim 8, wherein rendering the frames of the digital signage content includes rendering the frames in a browser application.

11. The method of claim 8, further comprising capturing sub-images of one or more of the rendered frames, wherein each captured sub-image is of a portion of a corresponding rendered frame of the digital signage content.

12. The method of claim 8, wherein the remote display device comprises a video wall comprising a grid of display devices.

13. A computer program product including one or more non-transitory machine readable mediums encoded with instructions that when executed by one or more processors cause a process to be carried out to provide a video stream for digital signage, the process comprising:
rendering a first set of frames of digital signage content in a software application, wherein the digital signage content includes interactive digital signage content;
in response to a detected event in the software application, capturing, from the software application, an image of each of a plurality of the rendered frames in the first set, wherein the software application does not display the digital signage content on a display screen;
transforming at least some of the captured images into a corresponding video frame of a video stream;
causing transmission of the video stream to a remote display device;
after causing transmission of the video stream to the remote display device, detecting an interactive session at the remote display device, wherein the interactive session includes user interaction with the video stream;
responsive to the interactive session, rendering a set of frames of alternative digital signage content in the software application, the alternative digital signage content being based on the interactive session; and
capturing, from the software application, an image of each of a plurality of the rendered frames of the alternative digital signage content.

14. The computer program product of claim 13, wherein:
the software application is a browser application; and
the images of the rendered frames of the digital signage content are captured in response to a "paint" event detected in the browser application.

15. The computer program product of claim 13, wherein rendering the frames of the digital signage content includes rendering the frames in a browser application.

16. The computer program product of claim 13, the process further comprising capturing sub-images of one or more of the rendered frames of the digital signage content, wherein each captured sub-image is of a portion of a corresponding rendered frame of the digital signage content.

17. The computer program product of claim 13, wherein causing transmission of the video stream includes causing a broadcast of the video stream.

18. The computer program product of claim 13, wherein the process further comprises:
transforming at least some of the images of the rendered frames of the alternative digital signage content into a corresponding video frame of an alternative unique video stream; and
causing transmission of the alternative unique video stream to the remote display device.

* * * * *